United States Patent [19]

Geary

[11] 4,175,755
[45] Nov. 27, 1979

[54] MECHANICAL SEAL ASSEMBLY
[75] Inventor: Carl H. Geary, Greensburg, Pa.
[73] Assignee: Carrier Corporation, Syracuse, N.Y.
[21] Appl. No.: 968,067
[22] Filed: Dec. 11, 1978
[51] Int. Cl.² .......................... F16J 15/00; F16J 15/34
[52] U.S. Cl. ..................................... 277/137; 277/94; 277/181
[58] Field of Search ............... 277/81 R, 83, 93 R, 277/93 SD, 94, 40, 41, 136, 137, 173–177, 181, 188 R, 189

[56] References Cited
U.S. PATENT DOCUMENTS

| | | | |
|---|---|---|---|
| 1,874,885 | 8/1932 | Buckley | 277/94 |
| 2,037,144 | 4/1936 | Olson | 277/136 X |
| 3,379,443 | 4/1968 | Park et al. | 277/40 |
| 4,018,544 | 4/1977 | Eberhardt | 277/137 X |
| 4,095,803 | 6/1978 | Meier et al. | 277/136 X |

*Primary Examiner*—Robert S. Ward, Jr.
*Attorney, Agent, or Firm*—J. Raymond Curtin; Barry E. Deutsch

[57] ABSTRACT

A shaft seal assembly for preventing process fluid contained within a rotary machine from escaping along the rotary shaft includes a stator affixed to the stationary housing of the rotary machine. The assembly further includes a non-rotating seal arranged to float in a radial direction and held against rotation by a locking pin. The locking pin is adapted to be in rolling engagement with a roller bearing for providing an antifriction motion therebetween.

4 Claims, 3 Drawing Figures

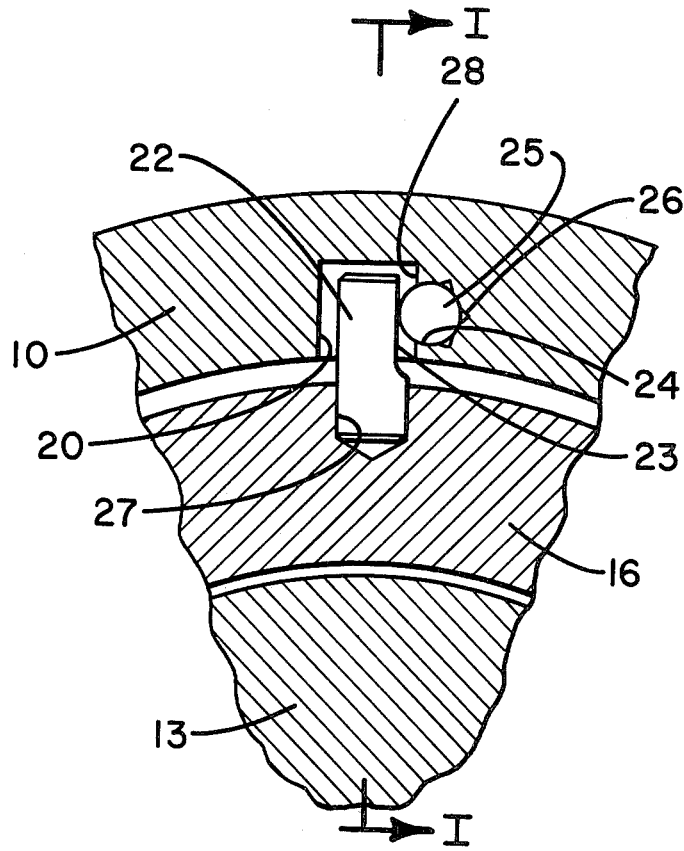

MECHANICAL SEAL ASSEMBLY

BACKGROUND OF THE INVENTION

1. Field of the Invention

The present invention relates to apparatus for minimizing fluid leakage between the rotating shaft and the stationary members in turbo-machinery such as turbines, compressors and the like. More particularly the invention relates to an improvement in a high pressure shaft seal of the type where the seal is prevented from rotating relative to the shaft.

2. Description of the Prior Art

In many high speed, high pressure machine applications, as for example those encountered in the turbine and compressor arts, the rotary components of the machine are mounted upon a shaft and the shaft is journaled for rotation within an opening formed for example in the end wall of a pressurized casing. Shaft seals are typically positioned within the casing opening to prevent pressurized fluid from escaping from high pressure regions to low pressure regions.

Non-rotating shaft seals are generally mounted within stationary components of the rotary machine with the opposed surfaces of the seals and components being in spaced apart relation. In conventional arrangements, for example, a pin is positioned between the seal and stationary portions of the compressor to prevent rotation of the seals. The pin is preferably press fitted into the stationary component, such as a seal stator element, for preventing the seal from rotating with the shaft. Although this pin connection does not allow the shaft seal to rotate, the connection is such that the shaft seal is permitted to move in a radial direction relative to the shaft. This is achieved by freely positioning the pin within a notch formed in the stationary element.

Shaft seals of the above described type are employed in turbomachines operating at relatively high pressure levels. Many of such machines are employed in applications requiring variable operating pressures. The radial movement of the shaft at high operating speeds and pressures produces a concomitant radial movement of the shaft seal. During prolonged use of the machine, the movement of the seal and pin, relative to the notch, results in the top surface of the pin gouging a channel or groove in the surrounding notch as the pin is forced into contact with a sidewall of the notch. At high speed and pressure condition, whereat relatively large radial shaft deflections are encountered, it has been found that the pin may become bound within the gouged channel. If the pin becomes bound, it may break due to the high load imposed upon the seal by the shaft. In addition, the seal surface encompassing the shaft will wear at a rapid rate since the seal cannot move radially once the pin is bound in the channel. Thus radial movement of the shaft into contact with the seal will eliminate the oil film normally found between the seal and shaft, thereby producing high shaft vibration and rapid wearing of the seal. These conditions are detrimental to the turbomachine's performance.

SUMMARY OF THE INVENTION

An object of the present invention is a seal assembly for preventing leakage between a high pressure region and a region of relatively low pressure in a rotary machine.

It is a further object of the present invention to provide a seal assembly having an extended life as compared to similar units of prior art seals.

Another object of the present invention is to provide a non-rotating sealing element connected to a stationary element by a pin in contact with a bearing surface for permitting relatively frictionless motion between the pin and surrounding stationary element.

Still another object of the present invention is a non-rotating sealing device which comprises a small number of simple parts and remains reliable under relatively extreme working conditions.

These and other objects of the present invention are attained by means of a seal assembly including a stationary casing having an opening for supporting a shaft of a rotary machine, a non-rotating seal encompassing the shaft and connected to a stationary element by a locking pin extending radially outward from the seal into a notch formed within the stationary element. The locking pin is arranged within the notch for permitting relative radial movement between the seal and stationary element. A hardened roller element is inserted into an axial hole formed in the stationary element and acts as a roller bearing for the pin.

DESCRIPTION OF THE PREFERRED EMBODIMENTS

Figure 1:
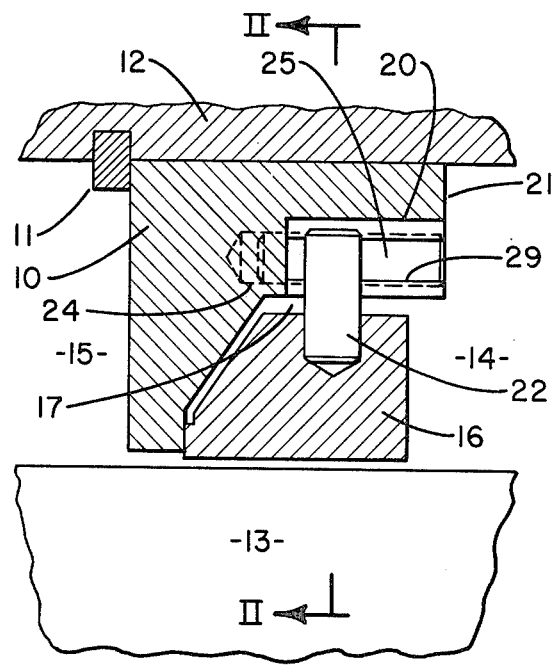
FIG. 1 is a partial axial sectional view of a seal assembly for a turbomachine employing the teachings of the present invention.
Figure 2:
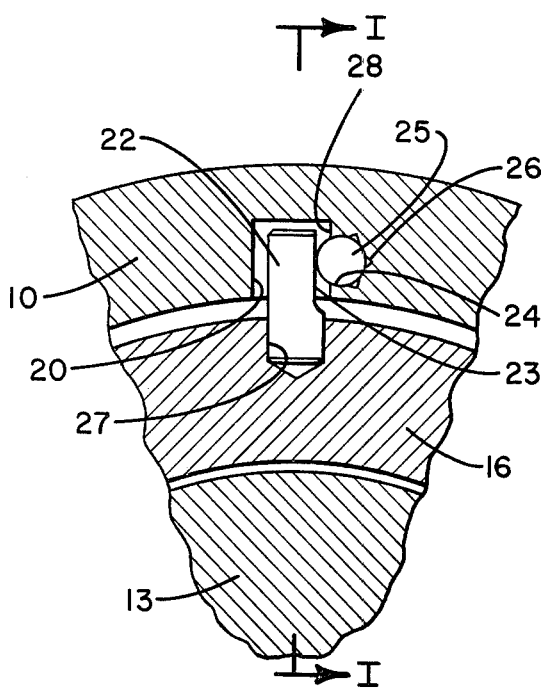
FIG. 2 is a sectional view taken along the line II—II of FIG. 1.

Referring now in detail to the drawings, FIGS. 1 and 2 show sectional views of a portion of a turbomachine including a stationary element, as for example an end wall structure or stator 10, carried within an opening formed in housing or outer casing 12 of the turbomachine, such as a centrifugal compressor or an axial turbine. Stator 10 is fixedly attached to casing 12 by conventional fastening means, as for example by shear key 11.

Stator 10 is provided with an opening through which rotary shaft 13 extends. Shaft 13 is arranged to pass in an axial direction from the high pressure machine region indicated by 14, to a low pressure region indicated by 15. Conventionally, the low pressure region is at or about atmospheric pressure. Stator 10 serves to position and retain seal or bushing member 16 having a close running fit with the outer periphery of shaft 13. The interior surfaces of stator 10 define a chamber 17 and are formed to complement the shape of seal bushing 16. An axially extending portion 21 of stator 10 is notched, as at 20, to receive radially extending locking or anti-rotation pin 22. Locking pin 22 is press fitted into hole 27 formed in seal bushing 16 and extends outwardly from seal bushing 16 into notch 20 to prevent rotation of the seal bushing about the shaft. Although locking pin 22 does not allow the seal bushing 16 to rotate, the connection between the pin and the stator is such that the sealing bushing is permitted to float freely in radial and axial directions to compensate for movement of shaft 13 during relatively high pressure and high speed operation.

Locking pin 22 is formed with a flat surface 23 thereon. Axially extending portion 21 of stator 10 is bored to provide an axial hole 24 in a selected one of the sidewall surfaces 28 defining notch 20. Hole 24 is bored into the particular sidewall of notch 20 towards which pin 22 is forced as a result of rotation of shaft 16. For example, as shown in FIG. 2, shaft 16 is rotating in a clockwise direction; thus hole 24 is formed in the right hand sidewall of notch 20. Hole 24 opens into notch 20 through slot 29. Slot 29 is of a smaller diameter than the diameter of hole 24 and provides an opening through wall 28 for a reason to be more fully described hereinafter. A hardened roller member 25 is inserted into hole 24 in a slide fit in contact with flat surface 23 formed on the surface of locking pin 22 facing hole 24. Roller member 25 is of a hardened alloy steel and is selected to have high wear and corrosion resistance characteristics at temperatures and high pressures generally established within the turbomachine. Roller member 25 should be highly polished and is inserted into axial hole 24. The width of hole 24 is slightly larger than the diameter of roller member 25 to permit the member to freely rotate about its own axis. Slot 29 acts to maintain roller member 25 within hole 24. Roller member 25 forms a bearing surface for pin 22 which minimizes the friction developed due to the relative radial motion of pin 22 and stator 10. Axial oil feed score holes 26 are formed on the face of the periphery of the stator end portion around the bearing surface to lubricate roller member 25. It is equally suitable to provide axial grooves along the length of roller member 25 to achieve lubrication. Oil is delivered into axial holes 26 from high pressure region 14 to continuously flush dirt or other solid contaminants from the axial holes.

Heretofore, the pin used to prevent rotation of the seal has been forced into direct contact with one of the sidewalls forming the retaining notch due to rotation of the shaft. Due to the angular relationship developed between the pin and contacting sidewall, the top of the pin contacts the upper portion of the sidewall. The pin eventually gouges a channel in the sidewall. As the seal is moved radially outward by radial movement of the shaft, the pin can become bound within the gouged channel. Subsequent movement of the shaft may result in breakage of the pin and failure of the seal, since the seal can no longer move radially in conjunction with the shaft. The introduction of roller member 25, acting as a roller bearing, between the mating surfaces of pin 22 and sidewall 28, prevents the pin from gouging a channel in the sidewall. In addition, the use of a roller bearing eliminates the sliding friction heretofore developed between the opposed surfaces of the pin and sidewall, thereby permitting freer radial movement of seal 16 in response to movement of shaft 13.

Preferably, pin 22 is formed with flat face or surface 23 in contact with roller member 25. The flat face will reduce the unit loading on the pin as compared to the loading developed through point contact between the pin and roller member.

Figure 3:
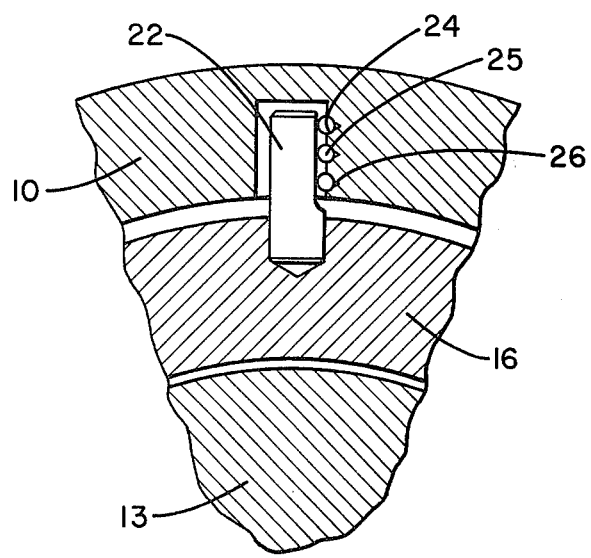
FIG. 3 is a view similar to FIG. 2 of another embodiment of the shaft seal assembly.

To increase the antifriction effect developed through the use of a roller bearing between pin 22 and sidewall 28, a plurality of roller members 25 may be inserted into axial holes 24 formed on the periphery of the end portion of the stator 10 to provide multiple needle bearings arranged in engagement with locking pin 22. This structure is shown in FIG. 3. Each axial hole 24 is provided with axial grooves 26 for oil to lubricate each bearing member.

In operation process fluid passing from the high pressure region 14 to the relatively lower pressure region 15 is restricted through seal ring 16 which normally allows the passage of only a small quantity of fluid. Under working conditions of high pressure and high temperature, machine vibrations are magnified thereby causing relatively large deflections of the shaft, resulting in corresponding radial movement of seal ring 16 within stator 10. Locking pin 22, secured to ring 16, also moves radially within notch 20. Moving in a radial direction, locking pin 22 slides relative to roller member 25, causing rotation of the roller about its own axis. The roller bearing surface provides relatively friction free motion of the locking pin. The oil contained within score openings 26 provides effective lubrication of roller member 25.

The disclosed arrangement provides a relatively simple, inexpensive, and very efficient means for preventing a seal from becoming radially stationary due to an anti-rotation pin becoming bound within a channel gouged in a stator element.

While a preferred embodiment of the invention has been described and illustrated, the invention should not be limited thereto, but may be otherwise embodied within the scope of the following claims.

What is claimed is:

1. A shaft seal assembly for use in a rotary machine for preventing a process fluid from escaping about the shaft comprising:
    a stationary element having an opening to reveive a rotary shaft;
    a seal member mounted on the shaft within said stationary element in close running fit relation to the shaft for preventing the process fluid from escaping from a high pressure region to a region of relatively lower pressure;
    a locking pin affixed to said seal member and extending radially outwardly from said seal member into engagement with said stationary element for connecting said seal member to said stationary element for preventing rotation of said seal member;
    said stationary element being formed with a notch for receiving said locking pin, the fit between said notch and said pin permitting said seal member to move radially outward relative to said shaft; and
    bearing means affixed to the stationary element and being disposed normal to said locking pin for defining a roller bearing surface in contact with a radially extending surface of said pin for permitting the pin and seal member to freely move radially outward into said notch.

2. A shaft seal assembly according to claim 1 wherein said locking pin is formed with a flat surface in rolling contact with said bearing surface of said roller bearing means.

3. A shaft seal assembly according to claim 2 wherein a plurality of roller bearing means are disposed in the stationary element in contact with said flat surface of said locking pin to provide a plurality of bearing surfaces.

4. A shaft seal assembly according to claims 1 or 3 wherein said roller bearing means is affixed within an axially extending hole formed in a selected one sidewall of said notch, the selection of said one sidewall being determined by the direction of rotation of said shaft.

* * * * *